No. 734,630. PATENTED JULY 28, 1903.
L. H. STOCKS.
MEANS OR APPARATUS FOR FRYING FISH OR OTHER ARTICLES.
APPLICATION FILED SEPT. 3, 1901.
NO MODEL. 2 SHEETS—SHEET 1.
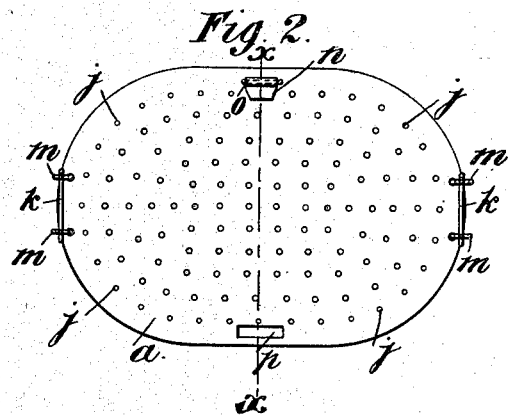
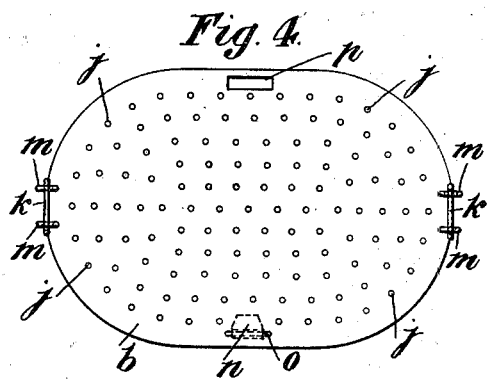
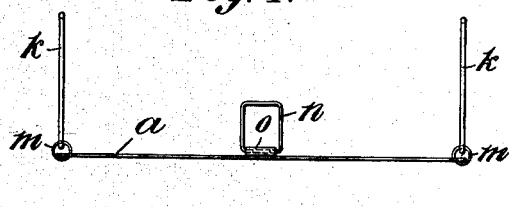
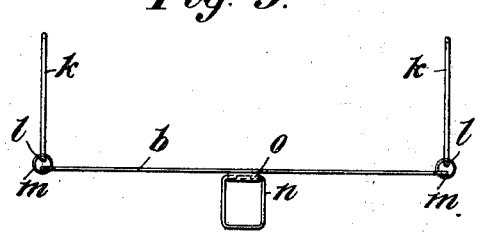
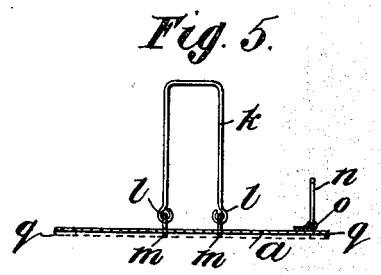
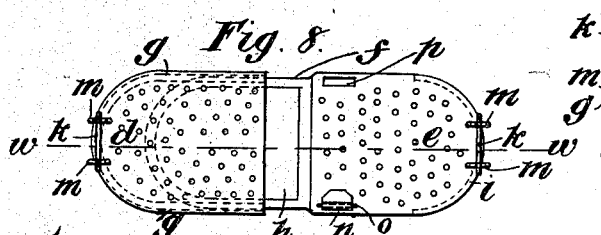
Witnesses:
William Sadler
Adam C. Hart
Inventor
Lucy Harriet Stocks
By H. Fairburn Hart
Attorney No. 734,630. PATENTED JULY 28, 1903.
L. H. STOCKS.
MEANS OR APPARATUS FOR FRYING FISH OR OTHER ARTICLES.
APPLICATION FILED SEPT. 3, 1901.
NO MODEL. 2 SHEETS—SHEET 2.
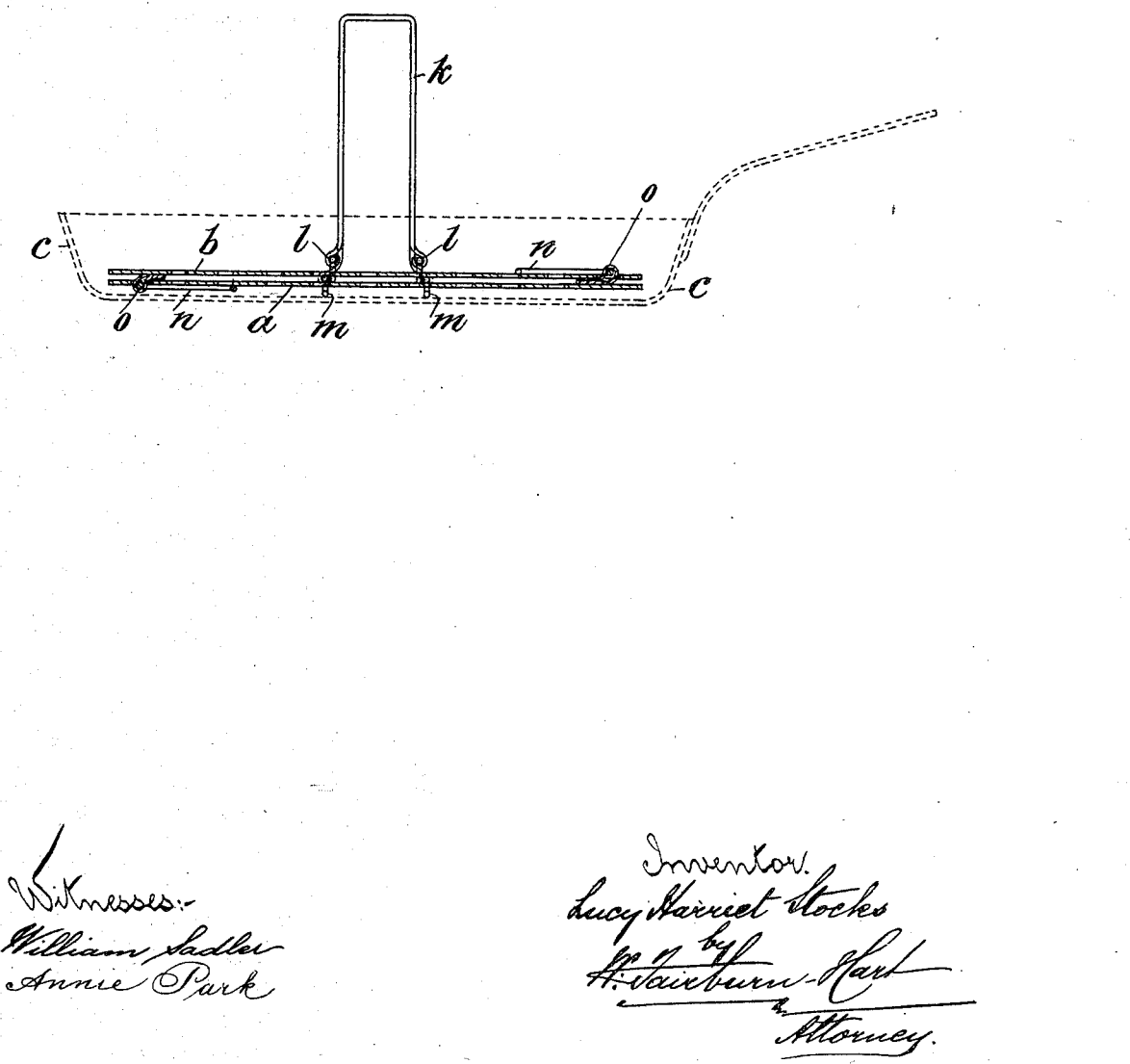

No. 734,630. Patented July 28, 1903.

UNITED STATES PATENT OFFICE.

LUCY HARRIET STOCKS, OF LEEDS, ENGLAND.

MEANS OR APPARATUS FOR FRYING FISH OR OTHER ARTICLES.

SPECIFICATION forming part of Letters Patent No. 734,630, dated July 28, 1903.

Application filed September 3, 1901. Serial No. 74,167. (No model.)

*To all whom it may concern:*

Be it known that I, LUCY HARRIET STOCKS, a subject of the King of Great Britain and Ireland, residing at Leeds, in the county of York, England, (whose post-office address is Norfolk House, Chapel Allerton, Leeds, England,) have invented new and useful Improvements in or Relating to Means or Apparatus for Frying Fish or other Articles, of which the following is a specification.

This invention relates to improvements in or relating to means or apparatus for frying fish and other articles of food.

The object of this invention is to provide simple and ready means whereby the fish or other article being fried or cooked may be readily removed from the frying-pan or other utensil, then turned over and replaced therein or placed upon a dish or other receptacle without there being any danger of breaking the same or its formation. I attain this object by apparatus illustrated in the accompanying drawings, in which—

Figure 1 is an elevation of one—say the lower—plate of the apparatus; Fig. 2, a plan of the same; Fig. 3, an elevation of the other—say the upper—plate of the apparatus; Fig. 4, a plan of same; Fig. 5, a section on line *x x*, Fig. 2; Fig. 6, a transverse section of two plates fastened together in the position when in use; Fig. 7, a longitudinal section of an adjustable plate or portion, drawn to a smaller scale, on line *w w*, Fig. 8; Fig. 8, a plan of same.

The frying apparatus consists of two flat detachable plates *a* and *b*, arranged to be placed one upon the other and to loosely fit into a frying-pan or other receptacle. (Shown in dotted lines at *c*, Fig. 6.) The plates are made in one piece, as shown at Figs. 1 to 4, or each plate may, if so desired, be made in two portions *d e*, Figs. 7 and 8, arranged to telescope or slide partly within each other—that is to say, when this latter method is employed one of the portions—say *e*—is provided with a projection *f*, which is bent or curved downward to the thickness of the plate *d* and then carried forward at or about a right angle, so as to be parallel with and to slide longitudinally in the turned-over edges *g* of, say, the plate *d*, which forms its guides. The central portion of the projection *f* may be removed at *h*, if so desired, but not necessarily so. The plate *e* may also have its edge turned or bent over, as at *i*, Fig. 7, to make it the same height as the plate *d*. By this means the size of the plates may be increased or diminished at pleasure. The said plates are made of metal, plain or enameled—say, for example, of thin sheet tin or steel—punched or cut to the shape shown at Figs. 2 and 4 or 7, and then perforated with any required number of holes *j*. If desired, the edges of the plates may be turned over, as at *q*, Fig. 5, to prevent them from buckling; but it is desirable that the plates should be kept as thin as possible in order to reduce to a minimum the amount of fat, which may be, say, in the form of butter, lard, or the like, required for the frying operation. The perforations *j* permit of the fat passing through the plate during the frying operation. Each of the said plates is provided with a pair of loop-like or other handles *k*, arranged one at each end of each plate, as shown at Figs. 1 and 3. In the drawings the handles *k*, which are shown like a rectangular fork shaped somewhat like the letter U inverted, are provided with a loop *l* at the end of each vertical portion. Each handle is attached to the plate by rings *m*, which are made to pass through the loops *l* and also through the plate, as shown at Figs. 1, 3, and 5. The handles *k* are attached to opposite ends or points of the plates, as at Figs. 1 and 3, and they are arranged so as to be capable of being readily turned for use with either face of the plate. At the same time by attaching the handles by the rings *m* to the plates the said rings do not unduly raise the plate from the bottom of, say, the frying-pan *c*.

Between the handles *k* and at the opposite points of each plate is respectively arranged means for retaining the two plates *a* and *b* together, consisting of a loop or catch, hereinafter termed a "loop-catch" *n*, hinged or otherwise pivotally jointed at *o* to the face of one plate—say *a*—and adapted to pass through the rectangular opening *p* of the other plate *b*, or vice versa, and, if desired, though not necessarily so, to be turned down onto the face of the upper plate *a*. Each plate *a* and *b*, as well as the plate shown in two portions at Figs. 7 and 8, is provided with a securing loop-catch n and with a rectangular opening p, arranged opposite thereto. When the two plates are in use together, the loop-catch n of one plate—say plate a—will be on its upper surface and the loop-catch n of plate b on its under surface, or the loop-catch and opening may be dispensed with, if so desired, and the two plates retained in position by the handles, either with or without additional openings.

In using the above-described apparatus for frying purposes—say frying soles—in the first instance only one plate a is used, and after it has been placed in the frying-pan c and the fat previously placed therein the fish or other article of food—say a sole—is laid thereon. After it has been fried sufficiently the second plate b is placed in position above the plate a, as at Fig. 6, with the sole between them, and the plates are securely fastened together by the loop catch or catches n having been passed through one or both of the openings p. The two plates are then raised by the handles k out of the pan c with, say, the sole or other article clamped between the said plates, turned over, and then replaced in the frying-pan, with the second plate resting on the bottom of the frying-pan. The first plate can, if so desired, be removed. On completion of the frying process the sole or other article can be removed by lifting the plate b out of the pan c and placing the fried sole or other article upon a dish or other receptacle.

When the plates are not in use, the handles k may be turned inward onto the face of the plates, and the latter suspended by the retaining catch-loop n.

Having now described the nature of this invention and how it may be carried into practice, what I claim, and desire to secure by Letters Patent, is—

1. An apparatus for frying purposes consisting of two detachable flat perforated plates placed one upon the other and provided with openings, handles attached by rings to each plate for lifting and turning purposes, and a loop-catch pivotally attached to each plate arranged to pass into an opening in the opposite plate for securing the said plates in position after the article to be cooked has been placed between them, all arranged and combined substantially as set forth.

2. In apparatus for frying purposes, the combination of a detachable flat perforated plate provided with an opening, handles attached to said plate at opposite points, rings for attaching said handles to the plate and a loop-catch pivotally jointed to the plate between the said handles and opposite to the said opening, all substantially as herein set forth.

In testimony whereof I have signed my name to this specification in the presence of two subscribing witnesses.

LUCY HARRIET STOCKS.

Witnesses:
 WILLIAM SADLER,
 ADAM C. HART.